April 1, 1941.   R. F. METZGER   2,236,714
APPARATUS FOR GRINDING LENSES
Original Filed Aug. 4, 1938
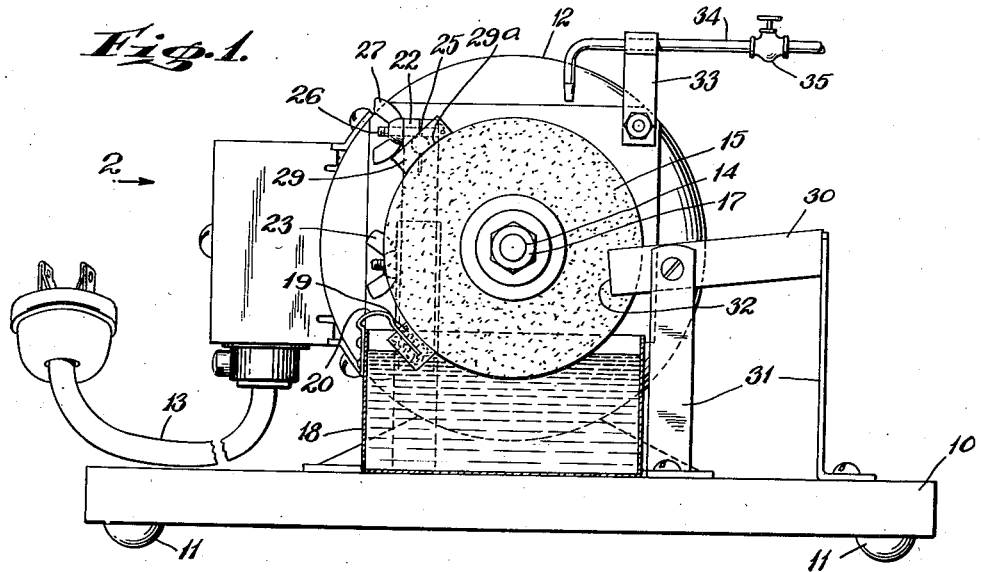
INVENTOR
REINHARDT FREDERICK METZGER.
BY
ATTORNEY Patented Apr. 1, 1941

2,236,714

UNITED STATES PATENT OFFICE 2,236,714

APPARATUS FOR GRINDING LENSES

Reinhardt Frederick Metzger, Glendale, N. Y.

Original application August 4, 1938, Serial No. 223,025. Divided and this application December 14, 1940, Serial No. 370,131

4 Claims. (Cl. 51—102)

This invention relates to apparatus for grinding lenses, particularly in the production of lenses of the type and kind disclosed in my prior application Serial No. 204,733, filed April 28, 1938 (which has issued as Patent No. 2,197,504 of April 16, 1940), and constitutes a division of my prior application Serial No. 223,025, filed Aug. 4, 1938; and the object of the invention is to provide an apparatus comprising a grinding wheel or disk with means adjustable transversely of the surface of the disk for gaging the radial depth of the grinding operation to be performed on the peripheral edge or edges of the lens; a further object being to provide means for moistening the grinding wheel or disk and for wiping the same clean in advance of engaging the workpiece; a still further object being to provide a work-piece supporting table adjacent the grinding wheel or disk and in spaced relation to the first named adjustable means for supporting the lens in forming a notch or indenture in the peripheral edge of a lens at one or more points circumferentially thereof; and with these and other objects in view the invention consists in an apparatus as more fully hereinafter described and claimed.

The invention is fully disclosed in the following specification, of which the accompanying drawing forms a part, in which the separate parts of my improvement are designated by suitable reference characters in each of the views; and in which:

Fig. 1 is an end view of one form of apparatus which I employ and with part of the construction shown in section.

Fig. 2 is a side view showing part of the construction shown in Fig. 1, looking in the direction of the arrow 2 of Fig. 1, and omitting part of the construction.

Fig. 3 is a detail view of a part of a lens indicating two steps in forming the coupling flanges on the peripheral edges thereof; and, Fig. 4 is a partial section on the line 4—4 of Fig. 3 on an enlarged scale.

This invention, which constitutes a division of the subject matter of my prior application Serial No. 223,025 filed August 4, 1938, deals with the formation of reduced flanges on other peripheral edge portions of lenses and particularly in eyeglass lenses to adapt the same for use in various kinds and classes of mountings, such for example as the type of mounting specifically described and claimed in my prior application Serial No. 204,733 hereinbefore identified. Only one form or type of lens construction is shown, it being understood that the apparatus herein disclosed is adaptable for use in shaping the peripheral edges of lenses of any kind or class especially in reducing the thickness of the lenses at the peripheral edges thereof by grinding one or both side surfaces of the lenses and further in reducing the radial dimension of the lenses at the peripheral edges thereof, especially in forming projecting, coupling or mounting flanges or elements.

In Figs. 1 and 2 of the drawing I have shown more or less diagrammatically one form of apparatus which consists in providing a suitable base plate 10 which may have a series of domes 11 of cushioning or other materials for arranging the plate on a workbench or table, or, if desired, the base plate may be fixedly secured to a table or bench.

Supported on the base plate 10 is an electric motor 12 with which is coupled the usual electric extension cord 13 for placing the motor in circuit with a source of electric supply, and any suitable means may be provided to control the stopping and starting of the motor as is well known in the art. At 14 is shown the motor shaft upon which is clamped a grinding wheel or disk 15 by means of a fixed sleeve 16 on the motor shaft and a nut 17. The wheel 15 is of the usual type employed in the grinding of lenses, and this wheel operates in a tank 18 of water, a wiper pad 19 being supported at one end of the tank on a spring arm 20 so as to wipe the outer surface of the wheel to clean it or to remove foreign material therefrom, while at the same time leaving the surface moist as will be apparent. The wiper pad 19 may be composed of any suitable soft material, such for example as a sponge or a body of rubber.

The wheel 15, as seen in Fig. 1 of the drawing, rotates in a clockwise direction and supported on the table 10 rearwardly of the wheel and to the left of the motor shaft 14 is a square standard 21 in which a square tube or rod 22 is adjustable vertically and held in different positions of adjustment by a wing nut 23 operating in an elongated slot 24 in the standard 21. The upper end of the tube or rod 22 is split as seen at 25, note Fig. 1, and passed through the split end is a bolt 26 having a wing nut 27 for clamping the rod 28 of a gage plate 29 in the upper end portion of the adjustable member 22 so that the position of the gage plate 29 may be adjusted transversely with respect to the surface of the wheel 15 to gage the radial depth of a grinding operation to be performed in a workpiece.

It will be understood that the vertical adjustment of the member 22 will adjust the inner edge 29a of the plate 29 with respect to the periphery of the wheel to conform therewith, and also to maintain the two surfaces spaced apart so as to provide free rotation of the wheel 15. This vertical adjustment will also compensate for the wear on the wheel as will be apparent.

At 30 is shown a workpiece supporting table arranged upon suitable supports 31, the inner end 32 of the table being lower than the outer end thereof and being recessed to receive the wheel 15 so as to permit the free passage of the wheel through the recess or notch in the table, while at the same time forming a support for the workpiece at both sides of the wheel, as will appear from a consideration of the width of the table 30, as seen in Fig. 2 of the drawing.

Supported upon the motor 12 is a bracket 33 for supporting a water drip pipe 34 to be arranged above the wheel 15 to supply water to the surface thereof prior to grinding a workpiece arranged upon the table 30. The inward inclination of the table will cause any water that may collect thereon to drop inwardly in the direction of the tank 18. A suitable valve 35 will be provided in the pipe 34 for regulating the water supply thereto.

I also preferably provide a hood 36 arranged upon the upper portion of the motor where the shaft 14 enters the motor, so as to form a projecting shield which will prevent any of the grindings from entering the motor to cause damage thereto. This hood is open at the bottom surface thereof so as to provide free circulation of air to cool the motor in the usual way.

To illustrate one use and adaptation of the invention, I have shown, in Figs. 3 and 4 of the drawing, parts of any eye-glass lens 38. In Fig. 3 of the drawing I have indicated the result of two different operations performed on a lens having a series of angularly arranged peripheral walls 39. At this time, it will be understood that the use of my invention is not limited to any particular shape of lens; the specific showing in the drawing is only for illustrative purposes.

At the left of Fig. 3 one of the peripheral edge portions of the lens is ground on two surfaces to form a reduced flange portion 40, which is of less thickness than the remainder of the adjacent portion of the lens, a groove being formed on opposed side surfaces of the lens as seen at 41 in Fig. 4 of the drawing. In this connection, it will be understood that only one of the grooves 41 need be employed, and this may be arranged on either surface of the lens in accordance with the teaching in said earlier application.

To adapt the lens for the use as taught in said earlier application, the end portions 40a of the flange 40, as seen at the left of Fig. 3 of the drawing, must be cut away or notched as seen at 42 at the right of Fig. 3 of the drawing so that the resulting flange 40 is of less length than the adjacent portion of the lens so as to form shoulders 43 at the ends of the flange 40. The nicking or notching operation is performed by laying the lens upon the table 30 and moving the portions 40a to be removed over the corners of the grinding wheel 15 as will be apparent.

Where undercut shoulders are required rather than the perpendicular or rectangular corners, special forms of grinding wheels will be employed.

It will of course be understood that the adjustment of the gage plate 29 will govern the radial depth of the cut to be performed in the lens to regulate the height of the protruding flange 40. In grinding a lens with a single grinding wheel, as shown in Figs. 1 and 2, the peripheral edge is held against the gage plate while the lens is supported upon the periphery of the grinding wheel and rocked back and forth in order to produce a straight line contour at opposite sides of the resulting flange 40, and the thickness of the cut formed at either or both side surfaces of the lens will be gaged by the operator.

It will be understood that in applying my improved method to eye-glasses of prescription specification, the frames or other accessories applied to the lens must be made to suit lenses of different kinds and classes and, therefore, the skill of a mechanic in performing the different grinding operations must be depended upon to suit the hardware or frame construction which has been selected, the latter being standardized to certain degree. However, in the mass production of lenses, such for example as sun-glasses and the like, it will be understood that the various operations performed on the lenses may be standardized and in such cases suitable gages will be provided for regulating the different operations to be performed, that is to say, in addition to the gage as at 29.

My invention relates, as will be apparent, to the grinding of lenses of various kinds and classes to adapt the same for what might be termed "Special" mounting or detachable mounting in suitable supports or frame parts, and in referring to lenses, I of course mean a transparent body of any type or kind which need not necessarily be glass, and which may be used for any purpose, such for example as in the production of watch crystals.

My present invention may be adapted for the construction of "Special" crystals for firm or positive mounting in watch-cases or irregular or special designs to prevent displacement of the crystal therefrom.

Having fully described my invention, what I claim as new and desire to secure by Letters Patent, is:

1. A grinding apparatus for grinding the peripheral edges of a lens, said apparatus comprising a base plate, an electric motor on said plate, a grinding wheel driven by said motor, a gage plate arranged perpendicularly to the axis of said wheel and extending along the periphery of the wheel, in close proximity thereto, for an extent materially less than one-quarter of the periphery of said wheel, means independent of the wheel and its mounting for adjusting said gage plate in its entirety relatively to the peripheral surface of the wheel to adjust said gage plate toward and from and transversely of the surface of the wheel, the edge portion of the gage plate adjacent the periphery of the wheel being curved to conform substantially to the contour of the surface of the wheel, and said adjustable means including means to rotatably adjust the gage plate in maintaining the curved edge of the gage plate in substantial parallelism to the surface of the wheel.

2. A grinding apparatus for grinding the peripheral edges of a lens, said apparatus comprising a driven grinding wheel mounted on a suitable support, a gage plate independently mounted on said support and adjustable relatively thereto and to said grinding wheel, the means for mounting said gage plate comprising a telescoping standard adapted for varying the height of said plate above said support, the upper extremity of said standard having transversely arranged clamping means, said gage plate having one edge thereof curved to closely conform to the contour of said wheel, said gage plate having secured to one surface thereof a cylindrical mounting rod protruding from said plate at a point subtantially centrally thereof, said rod being engaged by the clamping means of said standard, and providing free transverse and rotary adjustment of said plate thereby providing means for adapting the gage plate to the contour of the wheel.

3. In a grinding apparatus for use in forming grooves along peripheral edges of a lens, a driven grinding wheel, an adjustable gage means for controlling said grinding operation, said gage means comprising a standard extensible vertically with respect to said wheel, a transversely extending clamping means at the upper extremity of said standard, a transverse rod slidably and rotatably engaged by said clamping means, and an elongated plate member secured to one end of said rod and arranged in alinement with the periphery of said wheel, the edge of said plate adjacent said wheel being curved to closely conform to the peripheral contour thereof, the axis of said rod protruding from a point substantially centrally of said plate whereby rotatable adjustment of said rod will facilitate adjustment of the curved edge of said plate to the maximum degree of conformity with the peripheral surface of said wheel.

4. An apparatus for grinding grooves in the peripheral edge of a lens comprising a motor having an extending shaft, a grinding wheel secured to said shaft and rotated thereby, a lens gaging unit adjustable with respect to the periphery of said grinding wheel, said unit comprising relatively adjustable parts arranged in spaced relation to the shaft of the motor and inwardly with respect to the periphery of said grinding wheel, a backing plate adjustable in one of said first named parts in a direction parallel to the axis of said shaft to gage the position of said plate with respect to one side surface of the grinding wheel, said first named parts being adjustable to move said plate toward and from the periphery of the grinding wheel, and other means adjusting said plate to aline one edge thereof with respect to the peripheral surface of the wheel.

REINHARDT FREDERICK METZGER.